United States Patent
Wang et al.

(10) Patent No.: US 11,853,810 B2
(45) Date of Patent: Dec. 26, 2023

(54) EDGE TIME SHARING ACROSS CLUSTERS VIA DYNAMIC TASK MIGRATION BASED ON TASK PRIORITY AND SUBTASK RESULT SHARING

(71) Applicant: International Business Machines Corporation, Armonk, NY (US)

(72) Inventors: Yue Wang, Beijing (CN); Xin Peng Liu, Beijing (CN); Wei Wu, Beijing (CN); Zheng Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 17/143,383

(22) Filed: Jan. 7, 2021

(65) Prior Publication Data

US 2022/0214929 A1   Jul. 7, 2022

(51) Int. Cl.
   G06F 9/46        (2006.01)
   G06F 9/50        (2006.01)
   G06F 9/48        (2006.01)

(52) U.S. Cl.
   CPC .......... *G06F 9/5088* (2013.01); *G06F 9/4881* (2013.01); *G06F 2209/484* (2013.01)

(58) Field of Classification Search
   CPC . G06F 9/5088; G06F 9/4881; G06F 2209/484
   See application file for complete search history.

(56) References Cited

U.S. PATENT DOCUMENTS

| 10,558,581 B1* | 2/2020 | Lazier ................. G06F 21/6218 |
| 2009/0094605 A1* | 4/2009 | Brelsford .............. G06F 9/4843 |
| | | 718/100 |
| 2014/0075222 A1* | 3/2014 | Jackson ................. G06F 1/329 |
| | | 713/320 |

(Continued)

FOREIGN PATENT DOCUMENTS

| CN | 107819840 A | 3/2018 |
| CN | 108337691 A | 7/2018 |

(Continued)

OTHER PUBLICATIONS

Response-Time Analysis for globally scheduled Symmetric Multiprocessor Platforms; 2007, p. 149-160.*

(Continued)

*Primary Examiner* — Michael W Ayers
(74) *Attorney, Agent, or Firm* — Yee & Associates, P.C.

(57) ABSTRACT

Edge device task management is provided. It is determined whether a subtask cancel and migrate plan exists when a request to run a higher priority subtask of a second plurality of subtasks corresponding to a second task is received while a first task comprised of a first plurality of subtasks is running on a first cluster of edge devices. In response to determining that the subtask cancel and migrate plan does exist, a lower priority subtask of the first plurality of subtasks is canceled from a designated edge device of the first cluster of edge devices based on the subtask cancel and migrate plan. The lower priority subtask is migrated to another edge device for running based on the subtask cancel (Continued)

and migrate plan. The higher priority subtask of the second plurality of subtasks is sent to the designated edge device of the first cluster of edge devices for running.

17 Claims, 15 Drawing Sheets

(56) References Cited

U.S. PATENT DOCUMENTS

| | | | | |
|---|---|---|---|---|
| 2014/0323083 | A1* | 10/2014 | Caldwell | H04M 15/88 455/406 |
| 2015/0007185 | A1 | 1/2015 | Dey et al. | |
| 2015/0154056 | A1* | 6/2015 | Chen | G06F 9/4856 718/103 |
| 2018/0020077 | A1* | 1/2018 | Folco | G06F 9/50 |
| 2018/0095795 | A1* | 4/2018 | Hebert | G06F 9/4881 |
| 2020/0076875 | A1 | 3/2020 | Sabella et al. | |
| 2020/0218567 | A1 | 7/2020 | Kim et al. | |
| 2020/0364223 | A1* | 11/2020 | Pal | G06F 16/24539 |

FOREIGN PATENT DOCUMENTS

| | | |
|---|---|---|
| CN | 108509276 A | 9/2018 |
| CN | 109862592 A | 6/2019 |
| CN | 110109745 A | 8/2019 |
| CN | 110928691 A | 3/2020 |
| CN | 111427681 A | 7/2020 |
| CN | 111600648 A | 8/2020 |
| WO | WO2020104693 A1 | 5/2020 |

OTHER PUBLICATIONS

Harbour, Michael et al. Fixed Priority Scheduling of Periodic Tasks with Varying Execution Priority. Copyright 1991 IEEE. (Year: 1991).*

Chen et al., "A Dynamic Service-Migration Mechanism in Edge Cognitive Computing," ACM Transactions on Internet Technology, vol. 1, No. 1, Aug. 2018, 15 pages. https://dl.acm.org/doi/abs/10.1145/3239565.

"Pod Priority and Preemption," Kubernetes v1.14, accessed Dec. 3, 2020, 6 pages. https://kubernetes.io/docs/concepts/configuration/pod-priority-preemption/.

Mell et al., "The NIST Definition of Cloud Computing," Computer Security Division, National Institute of Standards and Technology, Jan. 2011, 7 pages.

PCT International Search Report and Written Opinion, dated Apr. 7, 2022, regarding Application No. PCT/CN2022/070312, 9 pages.

United Kingdom Intellectual Property Office Examination Report, dated Oct. 30, 2023, regarding Application No. GB2311130.5, 5 pages.

* cited by examiner

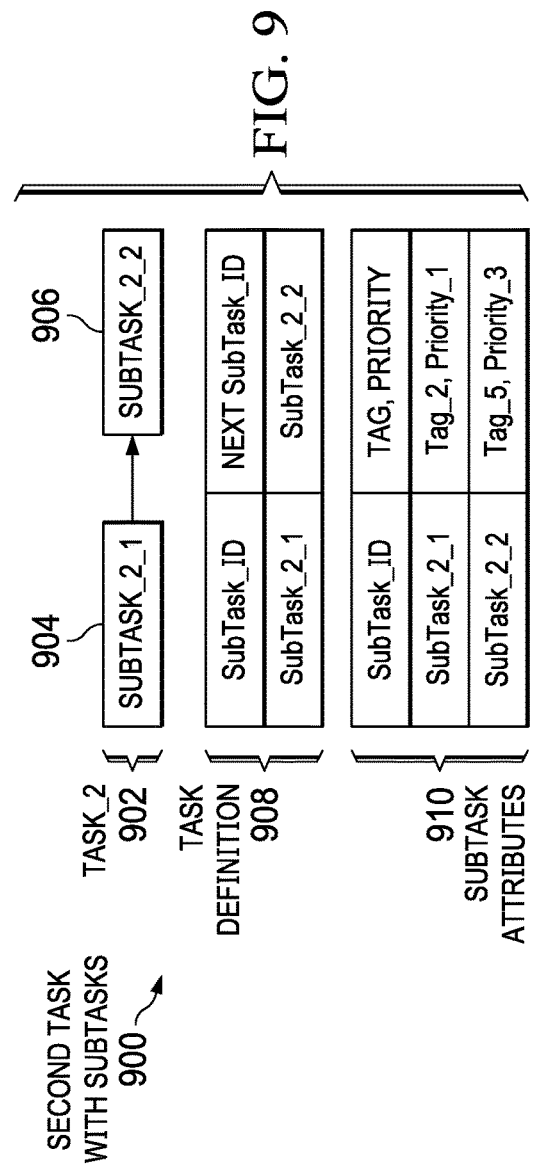

EDGE TIME SHARING ACROSS CLUSTERS VIA DYNAMIC TASK MIGRATION BASED ON TASK PRIORITY AND SUBTASK RESULT SHARING

BACKGROUND

1. Field

The disclosure relates generally to edge computing and more specifically to time sharing across clusters of edge devices using dynamic task migration based on task attributes.

2. Description of the Related Art

Edge computing is a distributed computing framework that brings applications closer to data sources, such as, for example, Internet of Things devices, local edge servers, and the like. This proximity to data at its source can deliver benefits, such as, for example, increased response times and increased bandwidth availability.

SUMMARY

According to one illustrative embodiment, a computer-implemented method for edge device task management is provided. It is determined whether a subtask cancel and migrate plan exists for an edge computing framework when a request to run a higher priority subtask of a second plurality of subtasks corresponding to a second task is received while a first task comprised of a first plurality of subtasks is running on a first cluster of edge devices in the edge computing framework. In response to determining that the subtask cancel and migrate plan does exist for the edge computing framework, a lower priority subtask of the first plurality of subtasks is canceled from a designated edge device of the first cluster of edge devices designated to run the higher priority subtask of the second plurality of subtasks based on the subtask cancel and migrate plan. The lower priority subtask of the first plurality of subtasks canceled from the designated edge device of the first cluster of edge devices is migrated to another edge device that is not included in the first cluster of edge devices for running based on the subtask cancel and migrate plan. The higher priority subtask of the second plurality of subtasks is sent to the designated edge device of the first cluster of edge devices for running. According to other illustrative embodiments, a computer system and computer program product for edge device task management are provided.

BRIEF DESCRIPTION OF THE DRAWINGS

FIG. 9 is a diagram illustrating an example of a second task with subtasks in accordance with an illustrative embodiment;

FIG. 10 is a diagram illustrating an example of an edge device attributes table in accordance with an illustrative embodiment;

DETAILED DESCRIPTION

Figure 1:
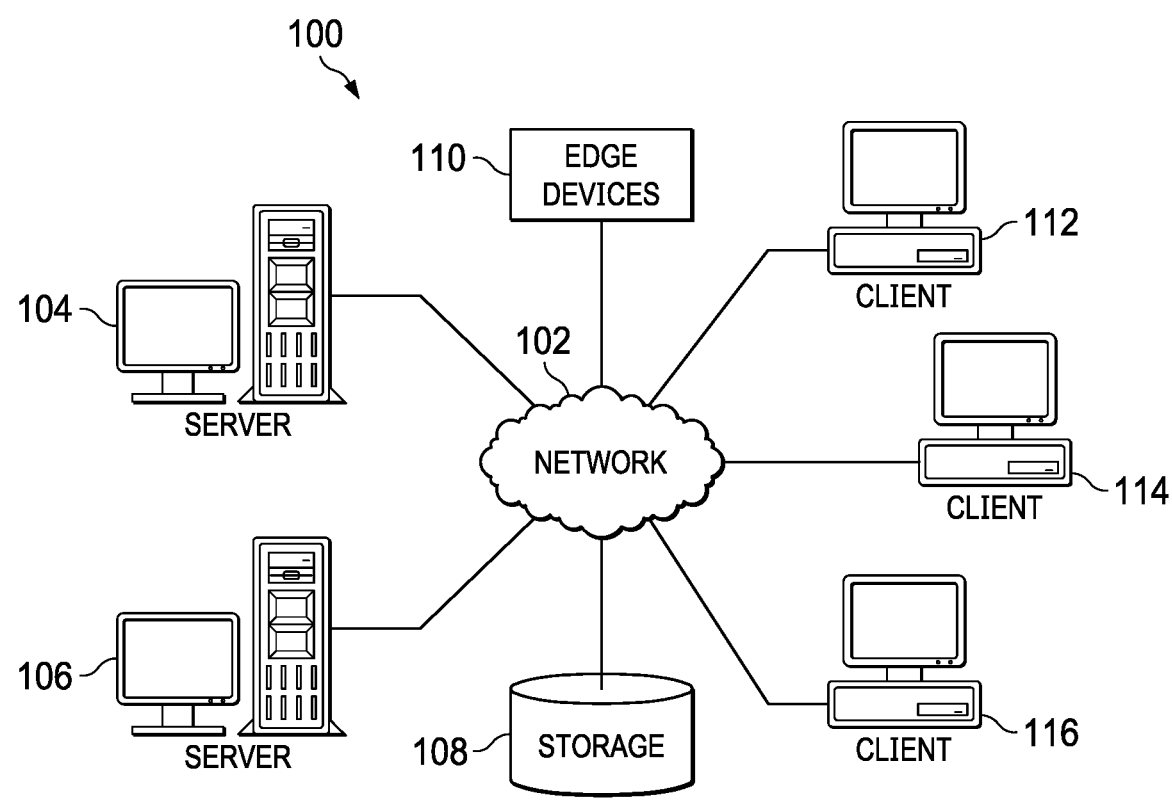
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108 and edge devices 110. Server 104 and server 106 are server computers with high-speed connections to network 102. In addition, server 104 and server 106 are application programming interface servers that provide task management services for edge devices 110. For example, server 104 and server 106 may manage performance of tasks by edge devices 110 using dynamic task migration across clusters of edge devices based on attributes of subtasks comprising the tasks. The tasks may be any type of task capable of being performed by edge devices 110. Edge devices 110 represent a plurality of different types of edge devices in an edge computing framework and may include, for example, network computers, network devices, smart devices, and the like. Also, it should be noted that server 104 and server 106 may each represent multiple computing nodes in one or more cloud environments.

Client 112, client 114, and client 116 also connect to network 102. Clients 112, 114, and 116 are clients of server 104 and server 106. In this example, clients 112, 114, and 116 are shown as desktop or personal computers with wire communication links to network 102. However, it should be noted that clients 112, 114, and 116 are examples only and may represent other types of data processing systems, such as, for example, laptop computers, handheld computers, mobile phones, gaming devices, and the like, with wire or wireless communication links to network 102. Users of clients 112, 114, and 116 may utilize clients 112, 114, and 116 to request performance of different types of tasks by server 104 and server 106.

Storage 108 is a network storage device capable of storing any type of data in a structured format or an unstructured format. In addition, storage 108 may represent a plurality of network storage devices comprising a set of data stores. Further, storage 108 may store identifiers and network addresses for a plurality of servers, identifiers and network addresses for a plurality of edge devices, edge device cluster metadata, task identifiers, task attributes, and the like. Furthermore, storage 108 may store other types of data, such as authentication or credential data that may include user names, passwords, and biometric data associated with system administrators and users, for example.

In addition, it should be noted that network data processing system 100 may include any number of additional servers, edge devices, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to edge devices 110 over network 102 for use on edge devices 110.

In the depicted example, network data processing system 100 may be implemented as a number of different types of communication networks, such as, for example, an internet, an intranet, a wide area network, a metropolitan area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
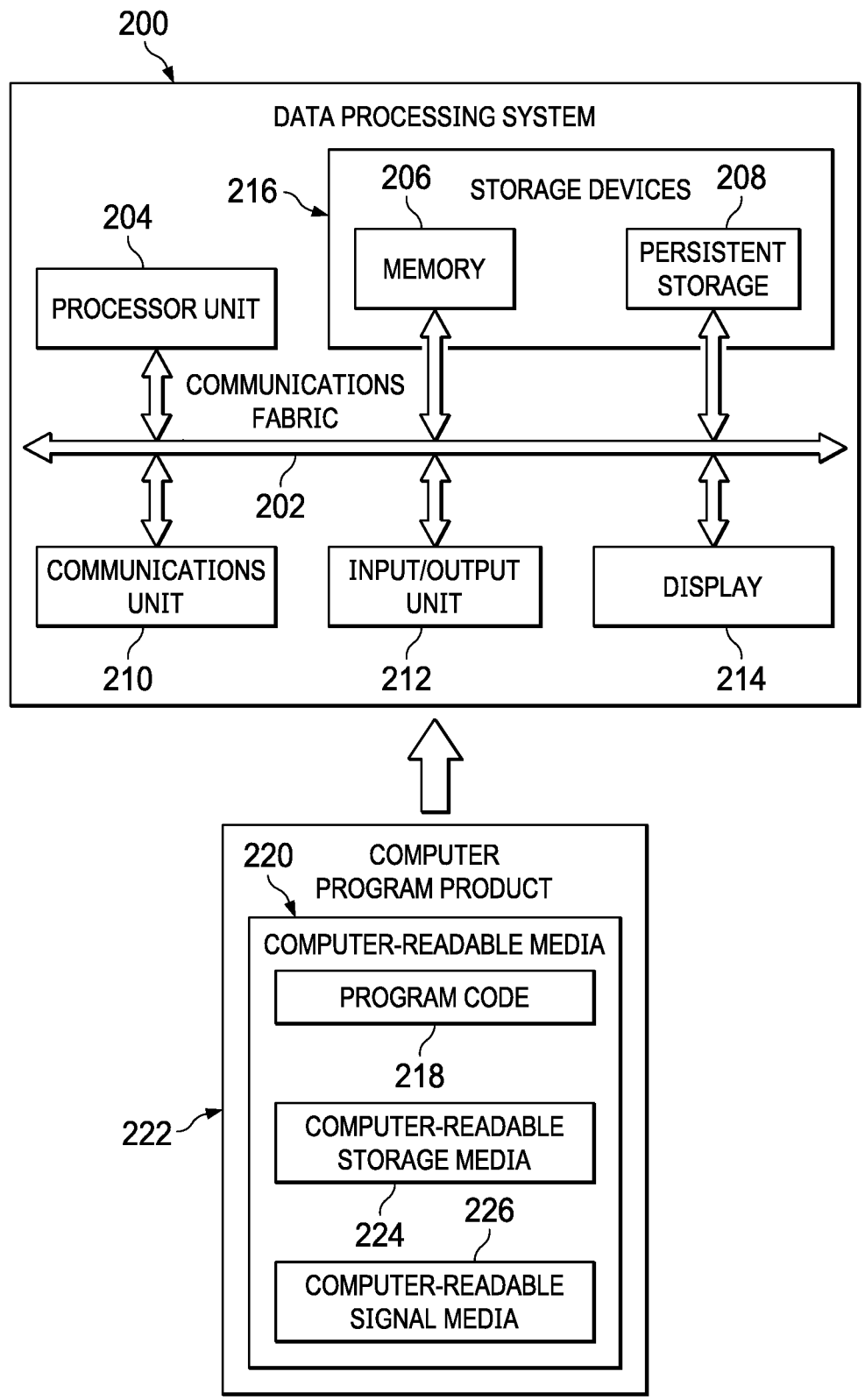
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing task management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226.

In these illustrative examples, computer readable storage media 224 is a physical or tangible storage device used to store program code 218 rather than a medium that propagates or transmits program code 218. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 220" can be singular or plural. For example, program code 218 can be located in computer readable media 220 in the form of a single storage device or system. In another example, program code 218 can be located in computer readable media 220 that is distributed in multiple data processing systems. In other words, some instructions in program code 218 can be located in one data processing system while other instructions in program code 218 can be located in one or more other data processing systems. For example, a portion of program code 218 can be located in computer readable media 220 in a server computer while another portion of program code 218 can be located in computer readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
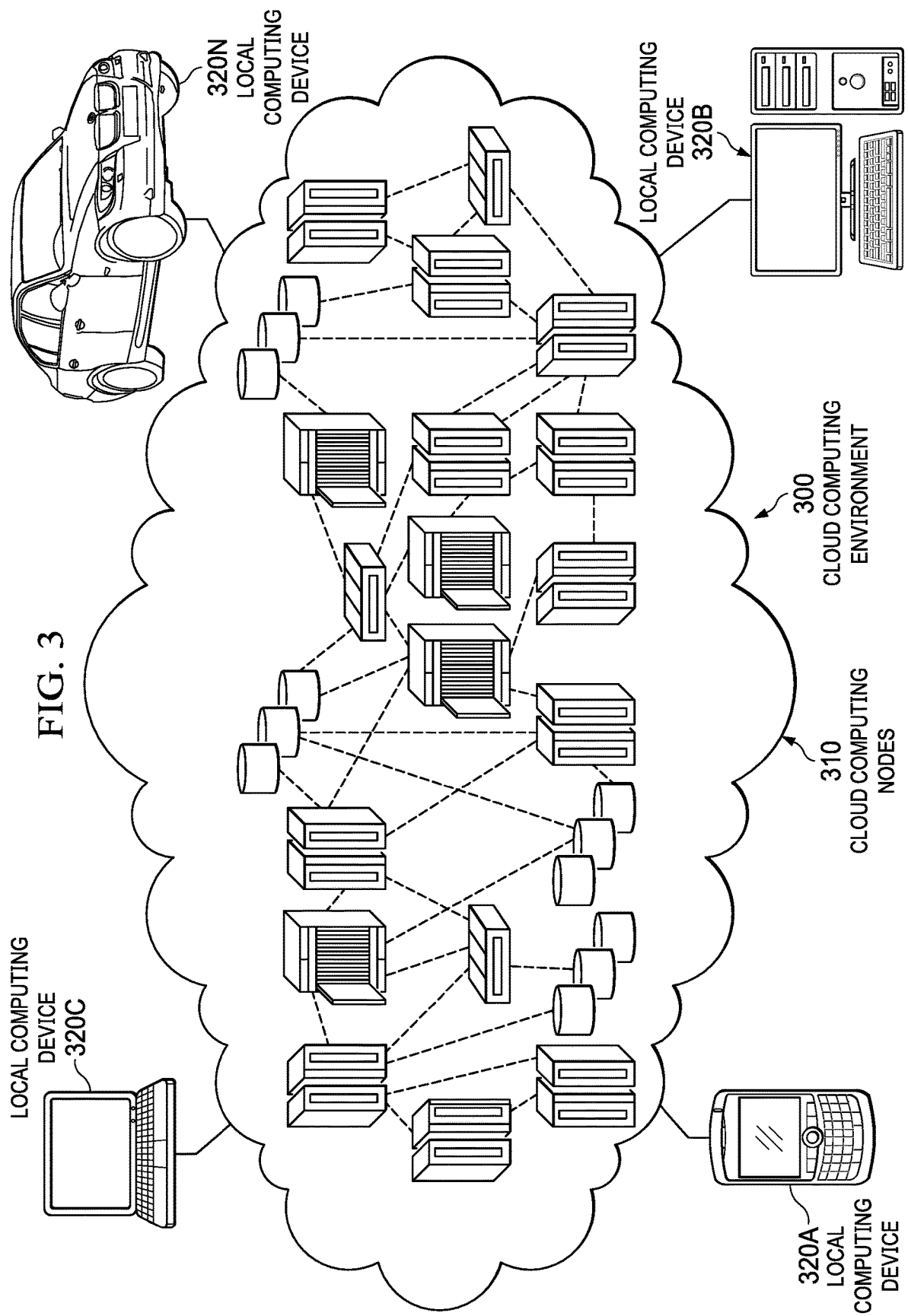
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may include, for example, edge devices 110 and clients 112-116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
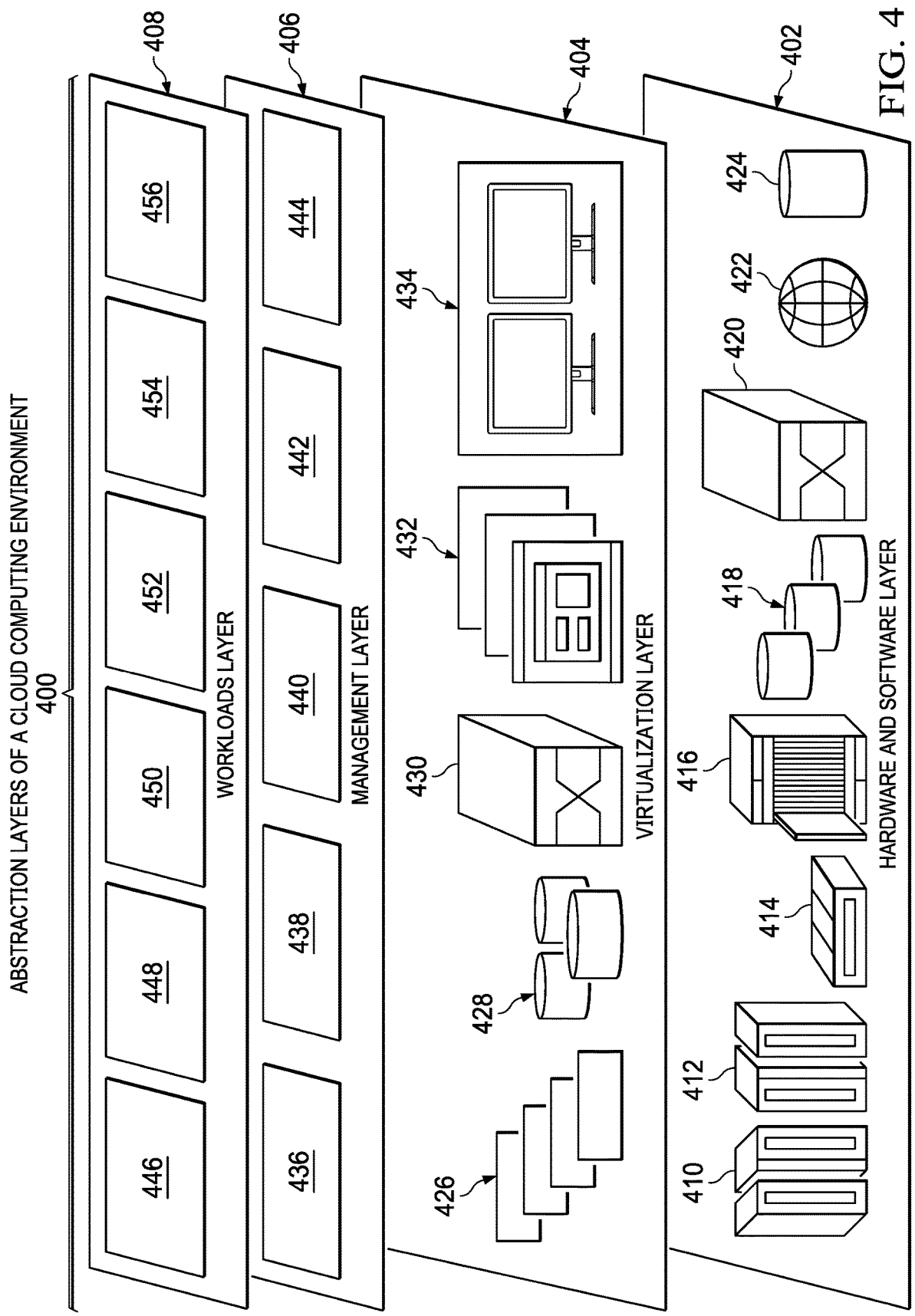
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and edge device task management 456.

The increase in the number of Internet of Things devices at the edge of a network is producing a massive amount of data to be computed at data centers, pushing network bandwidth requirements to their limits. Despite improvements in network technology, data centers cannot guarantee acceptable transfer rates and response times, which may be a critical requirement for many applications. Furthermore, Internet of Things devices at the edge constantly consume data coming from the cloud, forcing entities, such as, for example, enterprises, companies, organizations, institutions, agencies, and the like, to build content delivery networks to decentralize data and service provisioning, leveraging physical proximity to the end user.

Edge computing moves the computation away from data centers towards the edge of the network, exploiting Internet of Things devices, such as, for example, smart devices (e.g., smart phones, smart televisions, smart watches, smart glasses, smart vehicles, smart appliances, smart sensors, and the like), mobile phones, network gateways and devices, and the like, to perform tasks and provide services on behalf of the cloud. By moving tasks and services to the edge, it is possible to provide better response times and bandwidth availability.

With the development and spread of cloud computing, Internet of Things, and business models, edge computing becomes the next emerging technology to provide greater computational capabilities. Assisted by artificial intelligence edge controllers, edge computing has now been widely adopted in many industries involving dedicated programming and controlling of edge devices. An increasing number of different types of tasks or workloads will run on these edge devices. Considering cost factors, some edge devices are expensive and have limited functions, and may be shared among different tasks. Time sharing of edge devices improves resource utilization and decreases cost. Time sharing is the allocation of a computing resource among multiple tasks.

A variety of different tasks may run concurrently (i.e., at the same time) on a single edge computing framework comprised of a plurality of edge devices. In addition, collaboration, interaction, or conflict (e.g., task preemption on the same edge device) may exist among these different types of tasks. Further, priority and resource consumption of each task may be different. The edge computing platform needs to ensure that important tasks are properly prioritized and run smoothly, while scheduling resources reasonably and improving utilization of the edge computing platform. While giving higher priority to completing important tasks, under limited resource conditions, illustrative embodiments enable reasonable scheduling and use of edge devices to ensure that lower priority tasks continue to run, minimizing possible impact on task performance. In other words, illustrative embodiments enable edge device time sharing across clusters of edge devices via dynamic task migration.

Thus, illustrative embodiments increase edge layer capabilities by providing dynamic task migration based on attributes, such as priority and tags, corresponding to respective tasks. Furthermore, illustrative embodiments enhance the efficiency of the entire edge layer via a novel dynamic task migration process. Moreover, illustrative embodiments enable faster response times for edge device task performance, improving user experience.

Therefore, illustrative embodiments provide one or more technical solutions that overcome a technical problem with migrating tasks across clusters of edge devices. As a result, these one or more technical solutions provide a technical effect and practical application in the field of edge computing by increasing task performance and decreasing response time using dynamic task migration based on task attributes.

Figure 5:
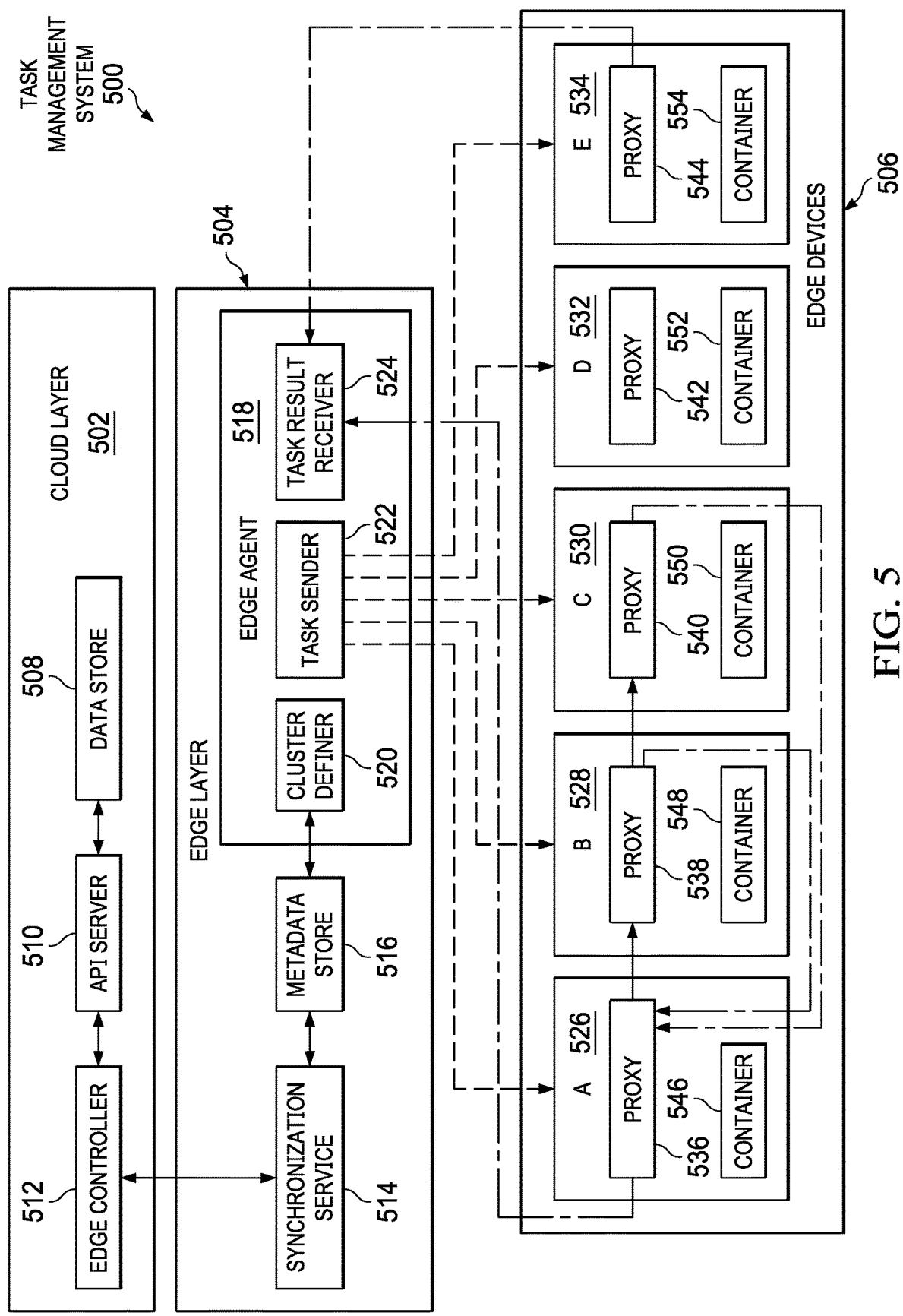
FIG. 5 is a diagram illustrating an example of a task management system in accordance with an illustrative embodiment.

With reference now to FIG. 5, a diagram illustrating an example of a task management system is depicted in accordance with an illustrative embodiment. Task management system 500 may be implemented in a network of data processing systems, such as network data processing system 100 in FIG. 1, or a cloud computing environment, such as cloud computing environment 300 in FIG. 3. Task management system 500 is a system of hardware and software components for time sharing across clusters of edge devices using dynamic task migration based on task attributes.

In this example, task management system 500 includes cloud layer 502, edge layer 504, and edge devices 506. Cloud layer 502 may be, for example, cloud computing environment 300 in FIG. 3. Cloud layer 502 includes data store 508, application programming interface server 510, and edge controller 512. Data store 508 may be, for example, storage 108 in FIG. 1, and includes, for example, edge device task management data. Application programming interface server 510 may be, for example, server 104 in FIG. 1, data processing system 200 in FIG. 2, or a cloud computing node in cloud computing nodes 310 in FIG. 3. Application programming interface server 510 receives user requests from client devices via a network to perform tasks. Application programming interface server 510 interacts with and manages edge devices 506 to perform the requested tasks. Edge controller 512 is responsible for connecting to all network gateways and edge devices 506 in the edge computing framework. In addition, edge controller 512 collects and collates data from edge devices 506, transmits data to and accepts instructions from application programming interface server 510 to execute across all or clusters of edge devices 506.

Edge layer 504 is responsible for connecting devices locally. In addition, edge layer 504 manages data collection and connection to application programming interface server 510. Edge layer 504 is also responsible for handling outages and storing and forwarding data. Edge layer 504 includes synchronization service 514, metadata store 516, and edge agent 518. Synchronization service 514 is responsible for synchronizing data to application programming interface server 510. Metadata store 516 contains metadata defining different clusters of edge devices included in edge devices 506. Metadata store 516 may retrieve the edge device cluster metadata from data store 508. Edge agent 518 communicates with edge devices 506 using cluster definer 520, task sender 522, and task result receiver 524. Cluster definer 520 defines the different clusters of edge devices using information in metadata store 516. Cluster definer 520 also refines clusters of edge devices in response to migration of tasks between edge devices. Task sender 522 assigns and sends tasks to respective edge devices based on corresponding task attributes, such as priority and tags. Further, task sender 522 cancels and migrates tasks on edge devices based on a task cancel and migration plan or reinvokes tasks on edge devices based on a task pending plan. Task result receiver 524 receives task status and results of running tasks on edge devices 506.

Edge devices 506 may be, for example, edge devices 110 in FIG. 1, and may include any type and combination of edge devices. In this example, edge devices 506 include edge device "A" 526, edge device "B" 528, edge device "C" 530, edge device "D" 532, and edge device "E" 534. However, it should be noted that edge devices 506 may include any number of edge devices. Also, edge device A 526, edge device B 528, edge device C 530, edge device D 532, and edge device E 534 include proxy 536, proxy 538, proxy 540, proxy 542, and proxy 544, respectively. Proxies 536-544 provide communication between edge devices 506. In addition, edge device A 526, edge device B 528, edge device C 530, edge device D 532, and edge device E 534 include container 546, container 548, container 550, container 552, and container 554, respectively. Containers 546-554 run the tasks sent to corresponding edge devices 506.

Figure 6:
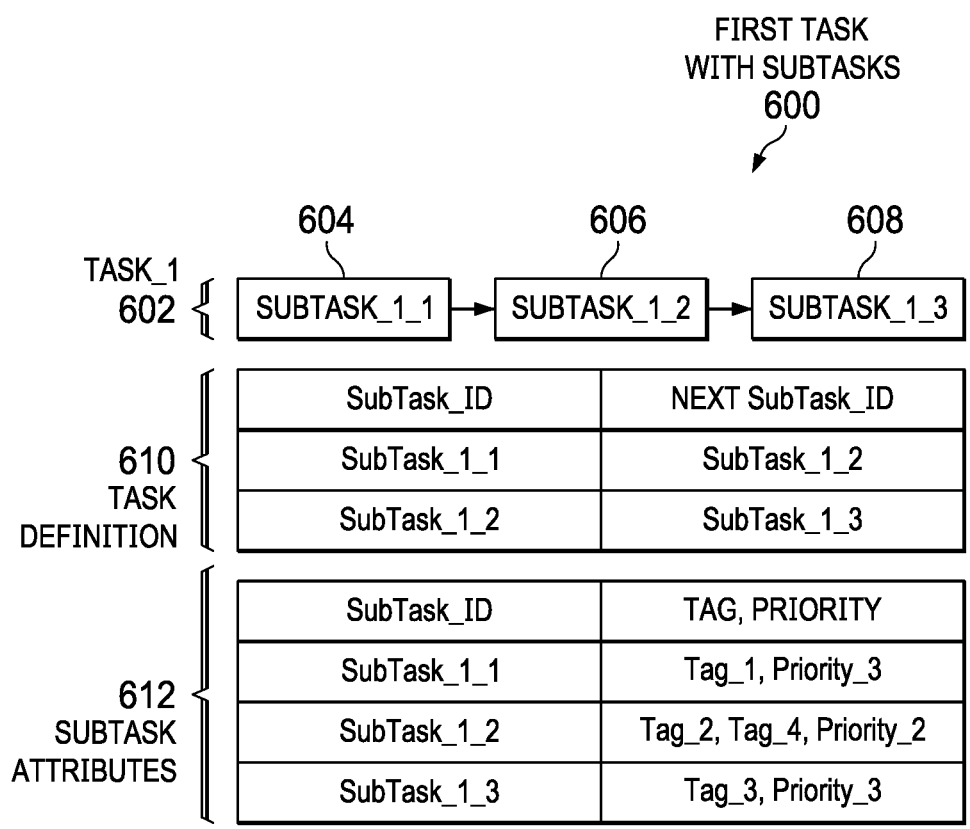
FIG. 6 is a diagram illustrating an example of a first task with subtasks in accordance with an illustrative embodiment.

With reference now to FIG. 6, a diagram illustrating an example of a first task with subtasks is depicted in accordance with an illustrative embodiment. First task with subtasks 600 may be implemented in a task management system, such as, for example, task management system 500 in FIG. 5.

In this example, first task with subtasks 600 is task_1 602 comprised of subtask_1_1 604, subtask_1_2 606, and subtask_1_3 608. However, it should be noted that task_1 602 is meant as an example only and not as a limitation on illustrative embodiments. In other words, task_1 602 may include any number of subtasks.

Task definition 610 of task_1 602 shows subtask identifiers with corresponding next subtask identifiers. In this example, subtask_1_1 has a corresponding next subtask of subtask_1_2 and subtask_1_2 has a corresponding next subtask of subtask_1_3. Subtask attributes 612 of task_1 602 shows subtask identifiers with corresponding tags and priorities. In this example, subtask_1_1 has corresponding tag_1 and priority_3, subtask_1_2 has corresponding tag_2, tag_4, and priority_2, and subtask_1_3 has corresponding tag_3 and priority_3. A tag indicates which particular edge device the corresponding subtask is to be run on. For example, tag_1 may indicate that the corresponding subtask is to run on edge device A, tag_2 may indicate that the corresponding subtask is to run on edge device B, tag_3 may indicate that the corresponding subtask is to run on edge device C, tag_4 may indicate that the corresponding subtask is to run on edge device D, and tag_5 may indicate that the corresponding subtask is to run on edge device E. The priority indicates the relative importance of running a particular subtask. For example, a higher priority subtask takes priority to run over a lower priority subtask.

Figure 7:
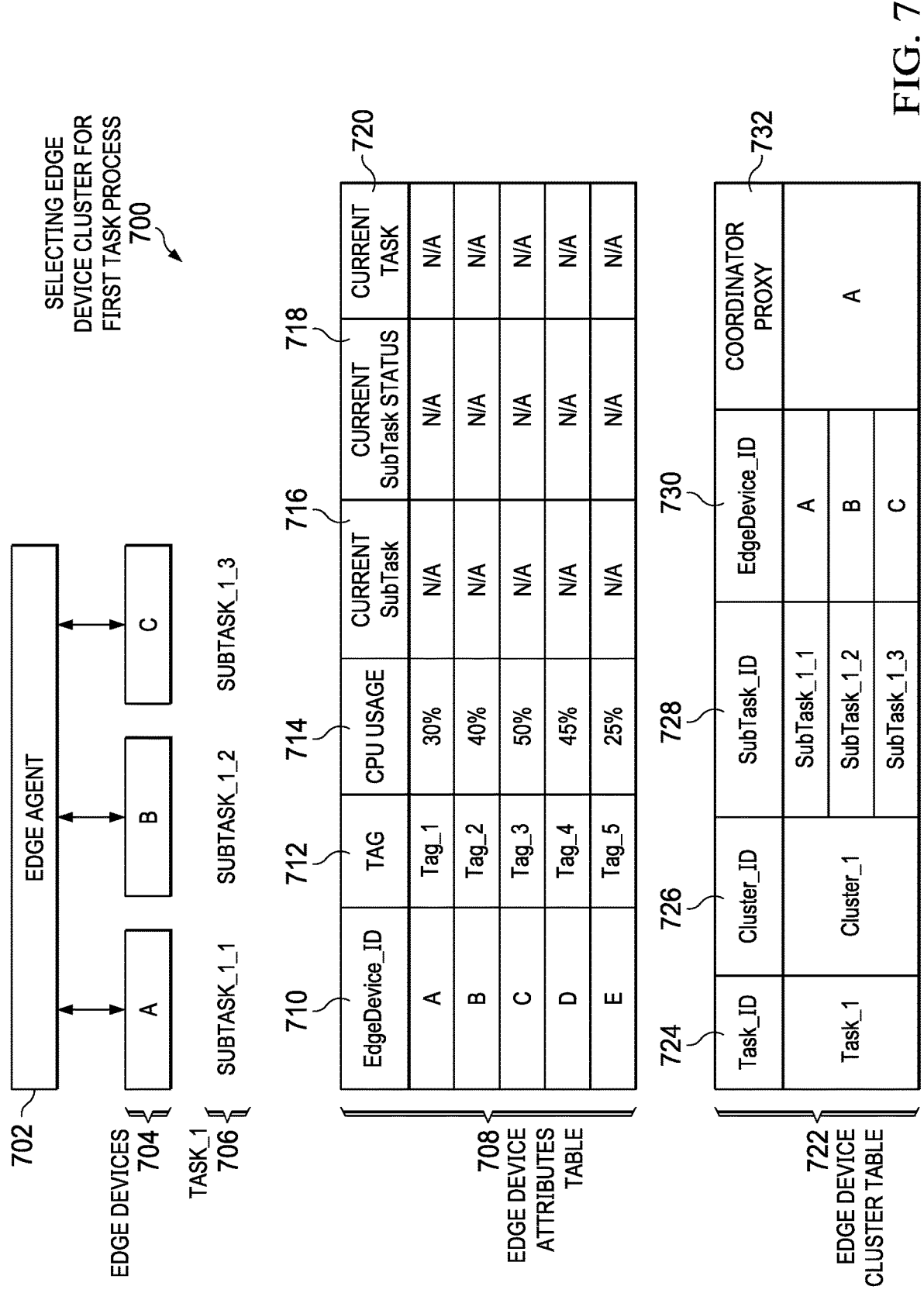
FIG. 7 is a diagram illustrating an example of a selecting edge device cluster for first task process in accordance with an illustrative embodiment.

With reference now to FIG. 7, a diagram illustrating an example of a selecting edge device cluster for first task process is depicted in accordance with an illustrative embodiment. Selecting edge device cluster for first task process 700 may be implemented in a task management system, such as, for example, task management system 500 in FIG. 5.

In this example, edge agent 702, such as, edge agent 518 in FIG. 5, utilizes a cluster definer, such as cluster definer 520 in FIG. 5, to define cluster_1 comprised of edge devices 704 for task_1 706. Edge devices 704 include edge device A, edge device B, and edge device C, such as, for example, edge device A 526, edge device B 528, and edge device C 530 in FIG. 5. Task_1 706 includes subtask_1_1, subtask_1_2, and subtask_1_3, such as, for example, task_1 602 including subtask_1_1 604, subtask_1_2 606, and subtask_1_3 608 in FIG. 6. Edge agent 702 utilizes a task sender, such as, for example, task sender 522 in FIG. 5, to send subtask_1_1, subtask_1_2, and subtask_1_3 to edge device A, edge device B, and edge device C, respectively, based on corresponding tags included in subtask attributes, such as subtask attributes 612 in FIG. 6, and cluster metadata from the cluster definer.

Edge device attributes table 708 includes edge device identifier 710, tag 712, CPU usage 714, current subtask 716, current subtask status 718, and current task 720. Edge device attributes table 708 shows attributes of edge devices 704 prior to task_1 706 being sent to edge devices 704. Edge device cluster table 722 includes task identifier 724, cluster identifier 726, subtask identifier 728, edge device identifier 730, and coordinator proxy 732. Edge device cluster table 722 shows selection of edge devices 704 (i.e., edge devices A, B, and C) as cluster_1 for task_1 706 comprised of subtask_1_1, subtask_1_2, and subtask_1_3. Edge device cluster table 722 also shows that the proxy on edge device A, such as, for example, proxy 536 on edge device A 526, is designated as a coordinator proxy for cluster_1. The coordinator proxy controls the network traffic (e.g., task results and task status) between edge devices 704 of cluster_1 based on cluster metadata.

Figure 8:
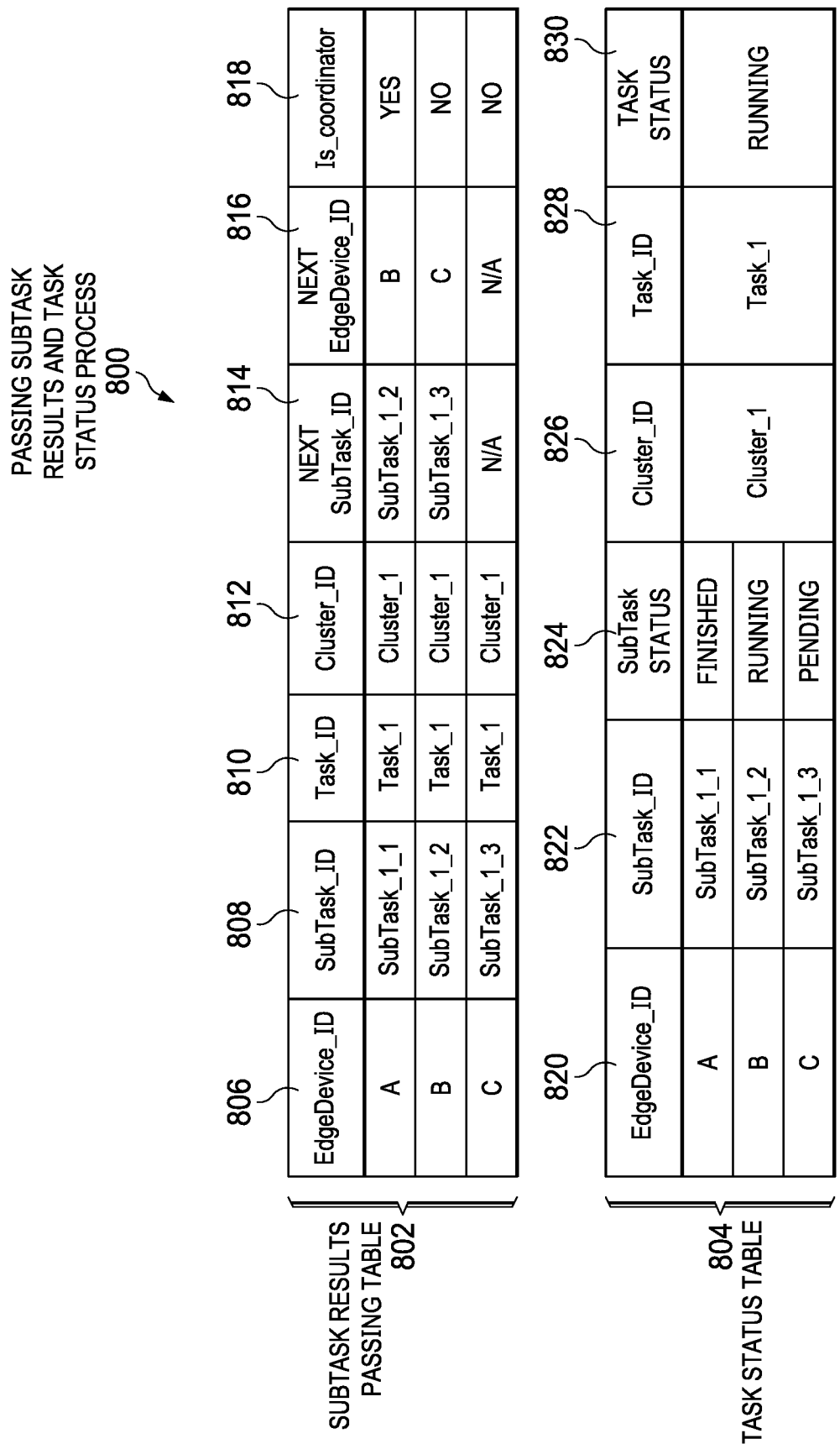
FIG. 8 is a diagram illustrating an example of a passing subtask results and task status process in accordance with an illustrative embodiment.

With reference now to FIG. 8, a diagram illustrating an example of a passing subtask results and task status process is depicted in accordance with an illustrative embodiment. Passing subtask results and task status process 800 may be implemented in a task management system, such as, for example, task management system 500 in FIG. 5.

In this example, passing subtask results and task status process 800 utilizes subtask results passing table 802 and task status table 804. Subtask results passing table 802 includes edge device identifier 806, subtask identifier 808, task identifier 810, cluster identifier 812, next subtask identifier 814, next edge device identifier 816, and is coordinator 818. Subtask results passing table 802 indicates that the coordinator proxy on edge device A receives results of each subtask and that the result of a respective subtask is sent to the next subtask (i.e., the next proxy on the next edge device) based on cluster metadata. Task status table 804 includes edge device identifier 820, subtask identifier 822, subtask status 824, cluster identifier 826, task identifier 828, and task status 830. Task status table 804 indicates the current status of task_1 is running on cluster_1 comprised of edge devices A, B, and C. In addition, task status table 804 indicates the current status of each subtask of task_1 on a corresponding edge device. For example, subtask_1_1 is finished running on edge device A, subtask_1_2 is running on edge device B, and subtask_1_3 is pending on edge device C.

With reference now to FIG. 9, a diagram illustrating an example of a second task with subtasks is depicted in accordance with an illustrative embodiment. Second task with subtasks 900 may be implemented in a task management system, such as, for example, task management system 500 in FIG. 5.

In this example, second task with subtasks 900 is task_2 902 comprised of subtask_2_1 904 and subtask_2_2 906. However, it should be noted that task_2 902 is meant as an example only and not as a limitation on illustrative embodiments. In other words, task_2 902 may include any number of subtasks.

Task definition 908 of task_2 902 shows a subtask identifier with corresponding next subtask identifier. In this example, subtask_2_1 has a corresponding next subtask of subtask_2_2. Subtask attributes 910 of task_2 902 shows subtask identifiers with corresponding tags and priorities. In this example, subtask_2_1 has a corresponding tag_2 and priority_1 and subtask_2_2 has a corresponding tag_3 and priority_3. The tag indicates which particular edge device the corresponding subtask is to be run on. For example, tag_2 indicates that subtask_2_1 is to run on edge device B and tag_5 indicates that subtask_2_2 is to run on edge device E. The priority indicates the relative importance of a particular subtask to run. For example, priority_1 indicates that subtask_2_1 is a high priority subtask that takes priority to run over a lower priority subtask.

With reference now to FIG. 10, a diagram illustrating an example of an edge device attributes table is depicted in accordance with an illustrative embodiment. Edge device attributes table 1000 may be implemented in a task management system, such as, for example, task management system 500 in FIG. 5. In this example, edge device attributes table 1000 includes edge device identifier 1002, tag 1004, CPU usage 1006, current subtask 1008, current subtask status 1010, and current task 1012. Edge device attributes table 1000 is similar to edge device attributes table 708 in FIG. 7. However, edge device attributes table 1000 shows attributes of edge devices A-E after subtask 1_1, subtask 1_2, and subtask 1_3 of task_1 were sent to edge devices A, B, and C, respectively, and prior to subtasks 2_1 and 2_2 being sent to selected edge devices.

Figure 11:
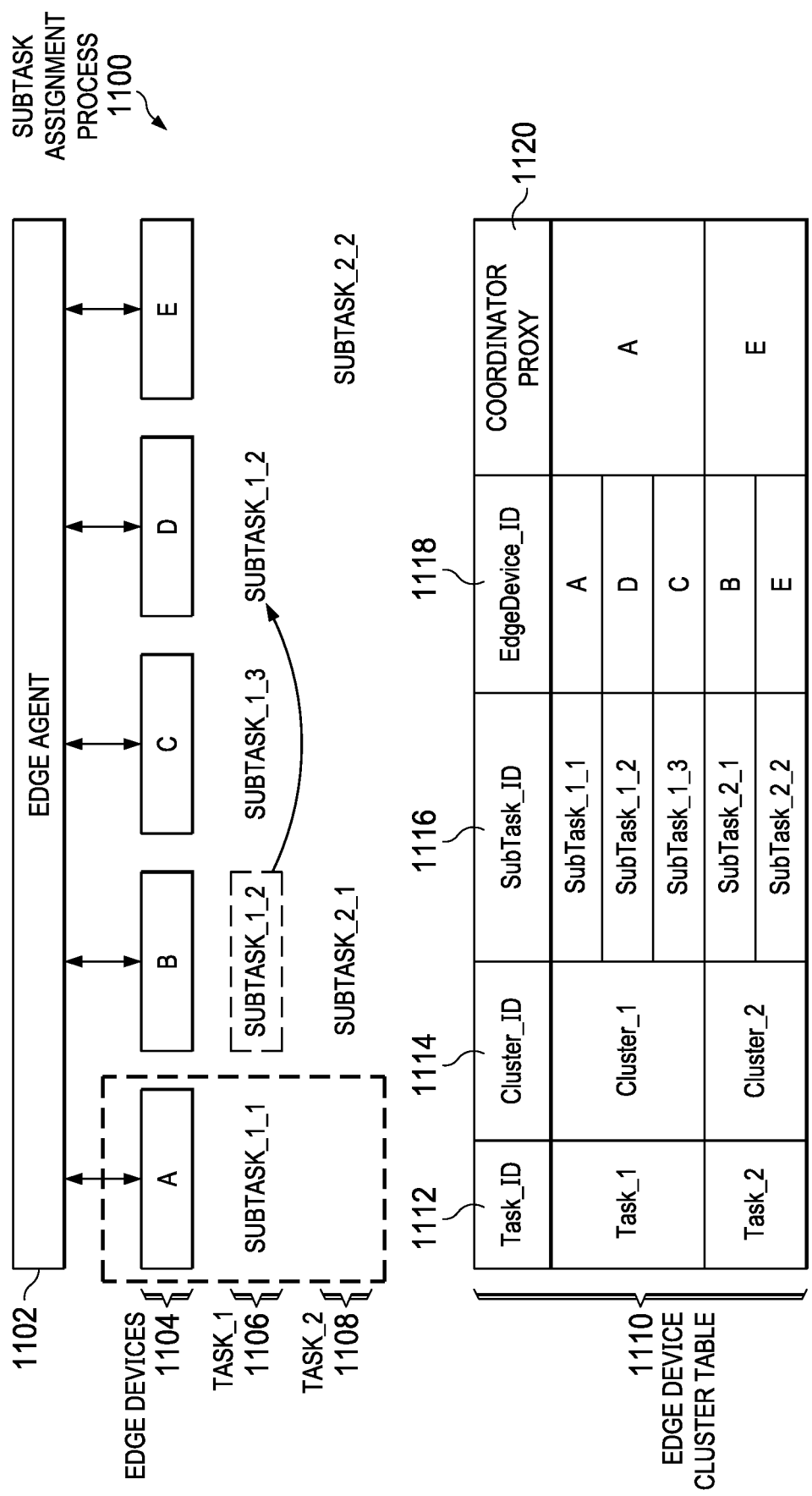
FIG. 11 is a diagram illustrating an example of a subtask assignment process in accordance with an illustrative embodiment.

With reference now to FIG. 11, a diagram illustrating an example of a subtask assignment process is depicted in accordance with an illustrative embodiment. Subtask assignment process 1100 may be implemented in a task management system, such as, for example, task management system 500 in FIG. 5.

In this example, edge agent 1102 utilizes a cluster definer, such as cluster definer 520 in FIG. 5, to define cluster_1 comprised of edge devices A, D, and C of edge devices 1104 for task_1 1106 and cluster_2 comprised of edge devices B and E of edge devices 1104 for task_2 1108. In addition, it should be noted that edge device A is running subtask_1_1 of task_1 1106, subtask_1_2 is pending on edge devices B, and subtask_1_3 is pending on edge devices C, when a user request is received to run task_2 1108. Because subtask_2_1 of task_2 1108 needs to run on edge device B of edge devices 1104 based on subtask attributes of tag and priority, such as, for example, tag_2 and priority_1 of subtask attributes 910 in FIG. 9, corresponding to subtask_2_1, a task sender, such as, for example, task sender 522 in FIG. 5, of edge agent 1102 assigns subtask_1_2 of task_1 1106 to be run on edge device D of edge devices 1104 based on subtask attributes of tags and priority, such as, for example, tag_2, tag_4, and priority_2 of subtask attributes 612 in FIG. 6, corresponding to subtask_1_2. Further, the task sender assigns subtask_2_2 to be run on edge device E of edge devices 1104 based on subtask attributes of tag and priority, such as, for example, tag_5 and priority_3 of subtask attributes 910 in FIG. 9, corresponding to subtask_2_2.

Edge device cluster table 1110 includes task identifier 1112, cluster identifier 1114, subtask identifier 1116, edge device identifier 1118, and coordinator proxy 1120. Edge device cluster table 1110 is similar to edge device cluster table 722 in FIG. 7 except edge device cluster table 1110 now includes information regarding cluster_2 corresponding to task_2 1108. In addition, edge device cluster table 1110 indicates that edge device D is now included in cluster_1 instead of edge device B. Edge device cluster table 1110 also shows that the proxy on edge device E, such as, for example, proxy 544 on edge device E 534, is designated as a coordinator proxy for cluster_2.

Figure 12:
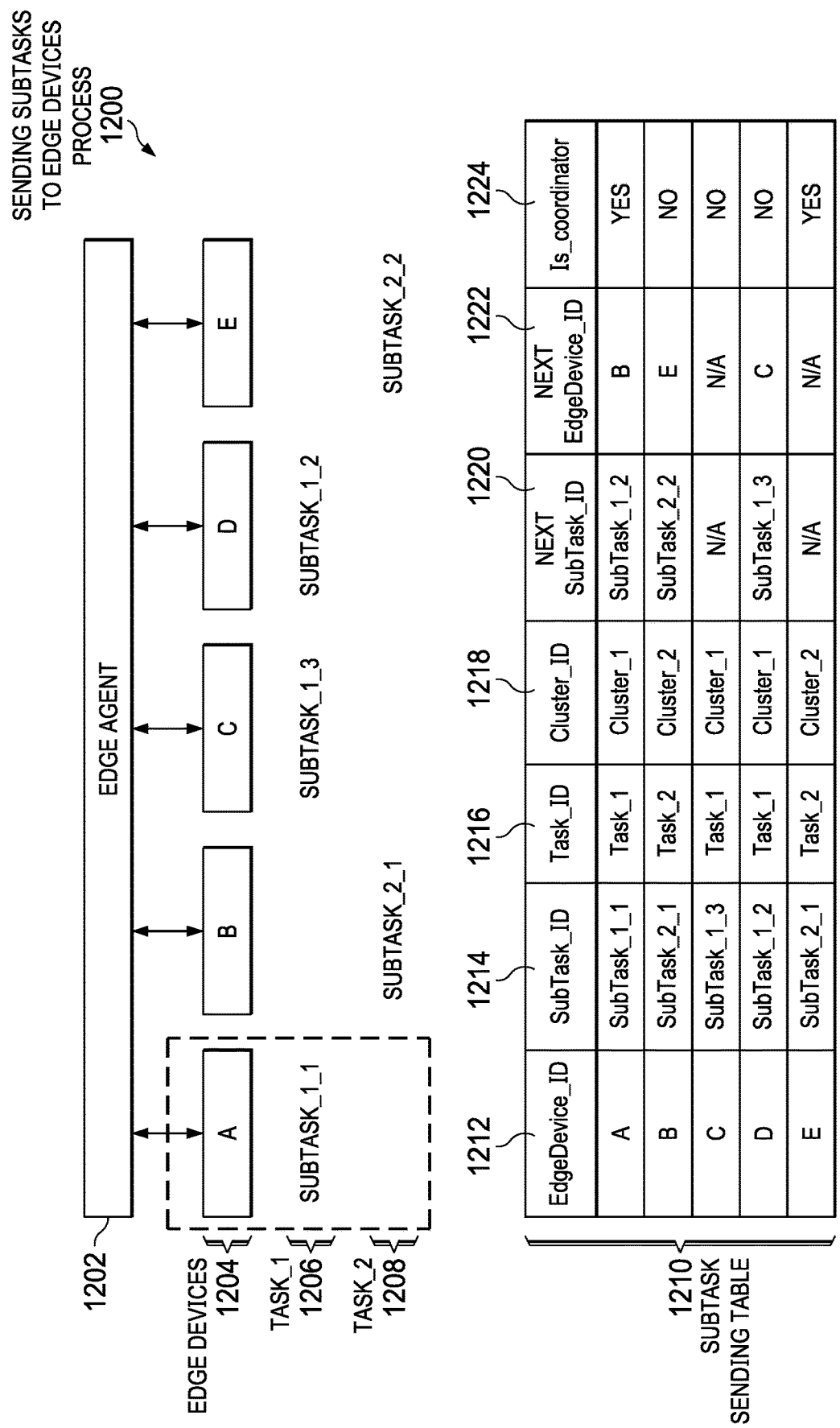
FIG. 12 is a diagram illustrating an example of a sending subtasks to edge devices process in accordance with an illustrative embodiment.

With reference now to FIG. 12, a diagram illustrating an example of a sending subtasks to edge devices process is depicted in accordance with an illustrative embodiment. Sending subtasks to edge devices process 1200 may be implemented in a task management system, such as, for example, task management system 500 in FIG. 5.

In this example, edge agent 1202 utilizes a task sender, such as, for example, task sender 522 in FIG. 5, to send tasks to edge devices 1204. The tasks in this example are task_1 1206 comprised of subtask_1_1, subtask_1_2, and subtask_1_3 and task_2 1208 comprised of subtask_2_1 and subtask_2_2. The task sender utilizes the information in subtask sending table 1210 to send respective subtasks to appropriate edge devices of edge devices 1204.

In this example, subtask sending table 1210 includes edge device identifier 1212, subtask identifier 1214, task identifier 1216, cluster identifier 1218, next subtask identifier 1220, next edge device identifier 1222, and is coordinator 1224. Because edge devices 1204 include edge device D, which is capable of running subtask_1_2, the task sender will send subtask_1_2 to be run on edge device D instead of edge device B. As a result, subtask_1_1 will run on edge device A, subtask_2_1 will run on edge device B, subtask_1_3 will run on edge device C, subtask_1_2 will run on edge device D, and subtask_2_2 will run on edge device E.

Figure 13:
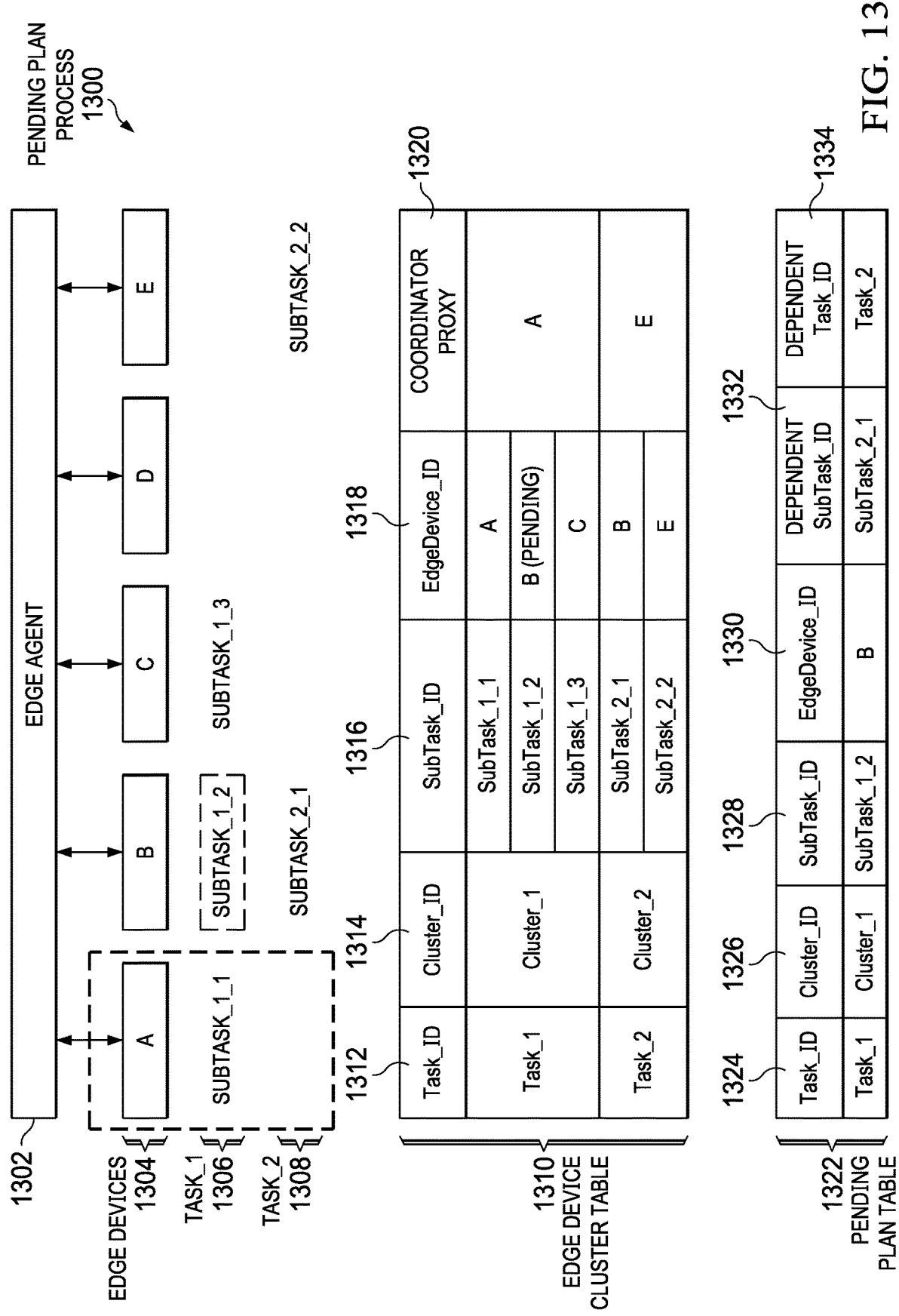
FIG. 13 is a diagram illustrating an example of a pending plan process in accordance with an illustrative embodiment.

With reference now to FIG. 13, a diagram illustrating an example of a pending plan process is depicted in accordance with an illustrative embodiment. Pending plan process 1300 may be implemented in a task management system, such as, for example, task management system 500 in FIG. 5.

In this example, edge agent 1302 utilizes a cluster definer, such as cluster definer 520 in FIG. 5, to define cluster_1 comprised of edge devices A, B, and C of edge devices 1304 for task_1 1306 and cluster_2 comprised of edge devices B and E of edge devices 1304 for task_2 1308. In addition, it should be noted that edge device A is running subtask_1_1 of task_1 1306 when a user request is received to run task_2 1308. Because subtask_2_1 of task_2 1308 needs to run on edge device B of edge devices 1304 based on its tag_2 and priority_1 attributes and edge devices 1304 do not include an edge device that is capable of running subtask_1_2 in this example, a task sender, such as, for example, task sender 522 in FIG. 5, of edge agent 1302 creates a pending plan (i.e., pending plan table 1322) for subtask_1_2 to run on edge device B when subtask_2_1 finishes running based on subtask_1_2 having a lower priority attribute (i.e., priority_2).

Edge device cluster table 1310 includes task identifier 1312, cluster identifier 1314, subtask identifier 1316, edge device identifier 1318, and coordinator proxy 1320. Edge device cluster table 1310 is similar to edge device cluster table 1110 in FIG. 11 except edge device cluster table 1310 indicates that subtask_1_2 is pending on edge device B and edge device B is included in both cluster_1 and cluster_2. Pending plan table 1322 includes task identifier 1324, cluster identifier 1326, subtask identifier 1328, edge device identifier 1330, dependent subtask identifier 1332, and dependent task identifier 1334.

Figure 14:
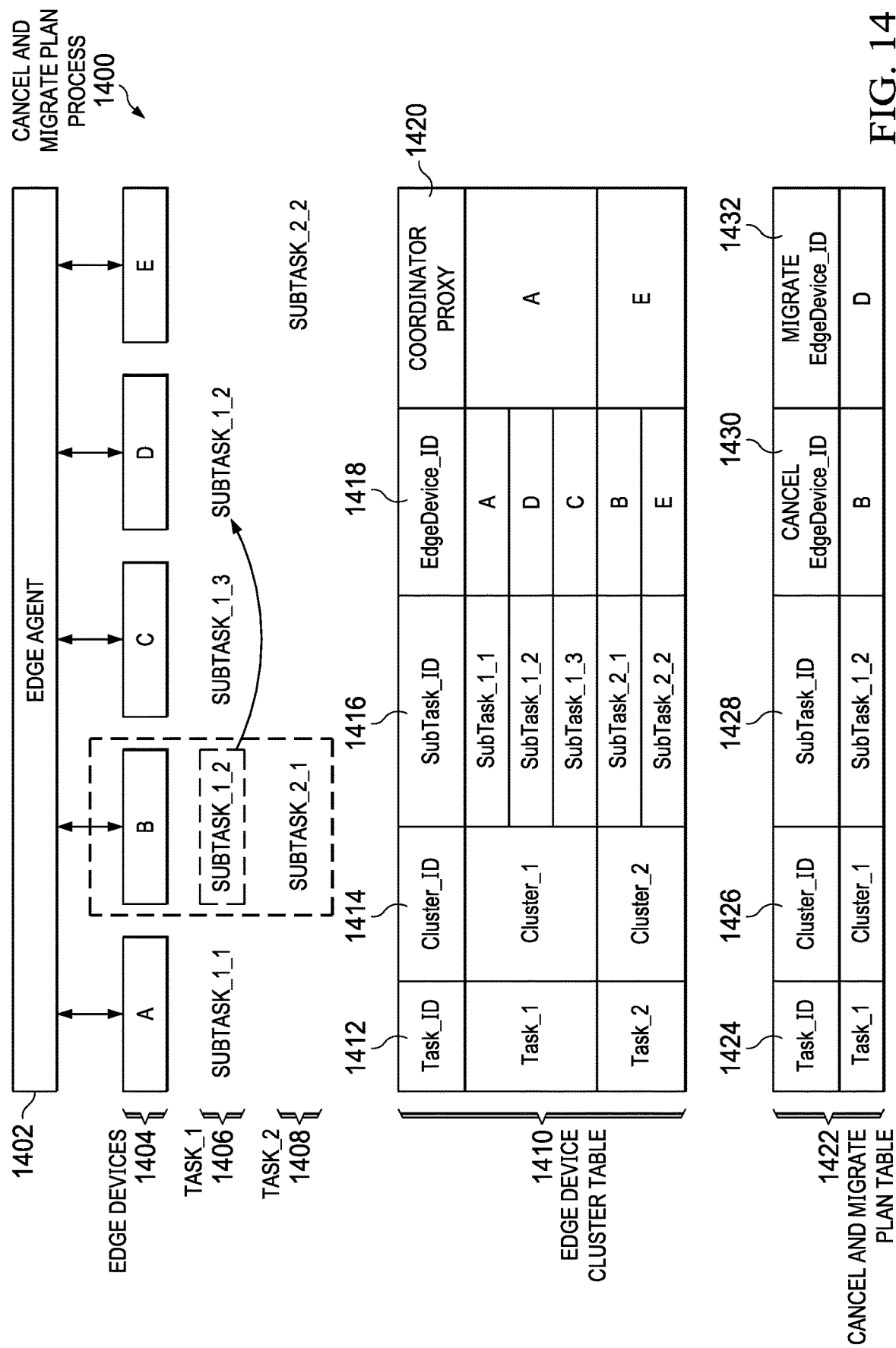
FIG. 14 is a diagram illustrating an example of a cancel and migrate plan process in accordance with an illustrative embodiment.

With reference now to FIG. 14, a diagram illustrating an example of a cancel and migrate plan process is depicted in accordance with an illustrative embodiment. Cancel and migrate plan process 1400 may be implemented in a task management system, such as, for example, task management system 500 in FIG. 5.

In this example, edge agent 1402 utilizes a cluster definer, such as cluster definer 520 in FIG. 5, to define cluster_1 comprised of edge devices A, D, and C of edge devices 1404 for task_1 1406 and cluster_2 comprised of edge devices B and E of edge devices 1404 for task_2 1408. In addition, it should be noted that edge device A is running subtask_1_1 of task_1 1406 when a user request is received to run task_2 1408. Because subtask_2_1 of task_2 1408 needs to run on edge device B of edge devices 1404 based on its tag_2 and priority_1 attributes and edge devices 1304 include edge device D, which is capable of running subtask_1_2 in this example, a task sender, such as, for example, task sender 522 in FIG. 5, of edge agent 1302 creates a cancel and migration plan (i.e., cancel and migration plan table 1422) for subtask_1_2 to cancel subtask_1_2 on edge device B and migrate subtask_1_2 to edge device D based on subtask_1_2 having a lower priority_2 attribute.

Edge device cluster table 1410 includes task identifier 1412, cluster identifier 1414, subtask identifier 1416, edge device identifier 1418, and coordinator proxy 1420. Edge device cluster table 1410 is similar to edge device cluster table 1110 in FIG. 11. Cancel and migration plan table 1422 includes task identifier 1424, cluster identifier 1426, subtask identifier 1428, cancel edge device identifier 1430, and migrate edge device identifier 1432.

Figure 15A:
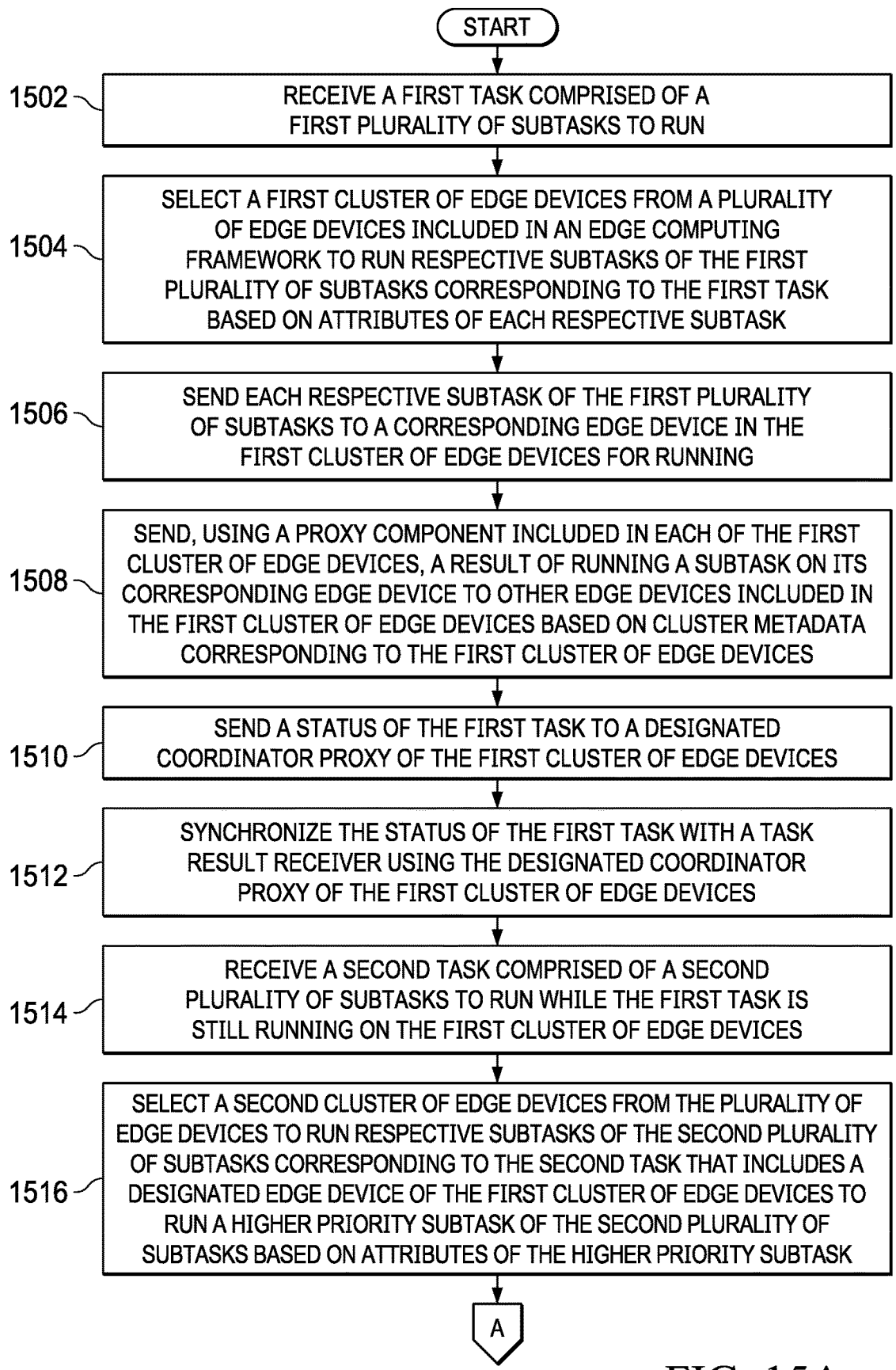
FIGS. 15A-15B are a flowchart illustrating a process for edge time sharing across clusters via dynamic task migration in accordance with an illustrative embodiment.
Figure 15B:
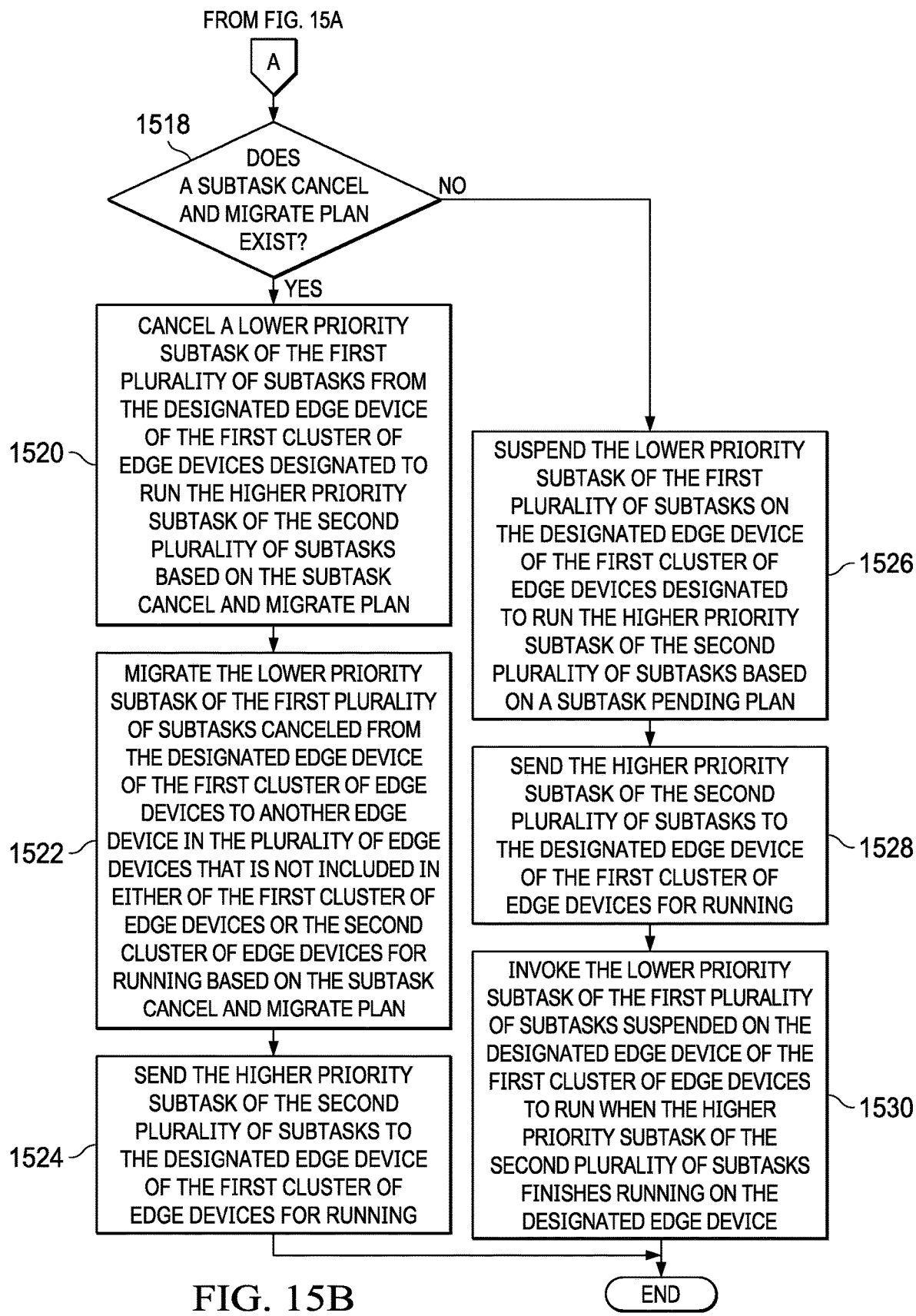

With reference now to FIGS. 15A-15B, a flowchart illustrating a process for edge time sharing across clusters via dynamic task migration is shown in accordance with an illustrative embodiment. The process shown in FIGS. 15A-15B may be implemented in a computer system, such as, for example, network data processing system 100 in FIG. 1, cloud computing environment 300 in FIG. 3, or task management system 500 in FIG. 5.

The process begins when the computer system receives a first task comprised of a first plurality of subtasks to run (step 1502). In response to receiving the first task, the computer system selects a first cluster of edge devices from a plurality of edge devices included in an edge computing framework to run respective subtasks of the first plurality of subtasks corresponding to the first task based on attributes of each respective subtask (step 1504). Then, the computer system sends each respective subtask of the first plurality of subtasks to a corresponding edge device in the first cluster of edge devices for running (step 1506).

Afterward, the computer system, using a proxy component included in each of the first cluster of edge devices, sends a result of running a subtask on its corresponding edge device to other edge devices included in the first cluster of edge devices based on cluster metadata corresponding to the first cluster of edge devices (step 1508). In addition, the computer system sends a status of the first task to a designated coordinator proxy of the first cluster of edge devices (step 1510). Further, the computer system synchronizes the status of the first task with a task result receiver using the designated coordinator proxy of the first cluster of edge devices (step 1512).

Subsequently, the computer system receives a second task comprised of a second plurality of subtasks to run while the first task is still running on the first cluster of edge devices (step 1514). In response to receiving the second task, the computer system selects a second cluster of edge devices from the plurality of edge devices to run respective subtasks of the second plurality of subtasks corresponding to the second task that includes a designated edge device of the first cluster of edge devices to run a higher priority subtask of the second plurality of subtasks based on attributes of the higher priority subtask (step 1516).

The computer system makes a determination as to whether a subtask cancel and migrate plan exists (step 1518). If the computer system determines that a subtask cancel and migrate plan does exist, yes output of step 1518, then the computer system cancels a lower priority subtask of the first plurality of subtasks from the designated edge device of the first cluster of edge devices designated to run the higher priority subtask of the second plurality of subtasks based on the subtask cancel and migrate plan (step 1520). Afterwards, the computer system migrates the lower priority subtask of the first plurality of subtasks canceled from the designated edge device of the first cluster of edge devices to another edge device in the plurality of edge devices that is not included in either of the first cluster of edge devices or the second cluster of edge devices for running based on the subtask cancel and migrate plan (step 1522). In addition, the computer system sends the higher priority subtask of the second plurality of subtasks to the designated edge device of the first cluster of edge devices for running (step 1524). Thereafter, the process terminates.

Returning again to step 1518, if the computer system determines that a subtask cancel and migrate plan does not exist, no output of step 1518, then the computer system suspends the lower priority subtask of the first plurality of subtasks on the designated edge device of the first cluster of edge devices designated to run the higher priority subtask of the second plurality of subtasks based on a subtask pending plan (step 1526). Further, the compute system sends the higher priority subtask of the second plurality of subtasks to the designated edge device of the first cluster of edge devices for running (step 1528). Subsequently, the computer system invokes the lower priority subtask of the first plurality of subtasks suspended on the designated edge device of the first cluster of edge devices to run when the higher priority subtask of the second plurality of subtasks finishes running on the designated edge device (step 1530). Thereafter, the process terminates.

Thus, illustrative embodiments of the present invention provide a computer-implemented method, computer system, and computer program product for time sharing across clusters of edge devices using dynamic task migration based on attributes of subtasks. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for edge device task management, the computer-implemented method comprising:

determining whether a subtask cancel and migrate plan exists for an edge computing framework when a request to run a higher priority subtask of a second plurality of subtasks corresponding to a second task is received while a first task comprised of a first plurality of subtasks is running on a first cluster of edge devices in the edge computing framework;

responsive to determining that the subtask cancel and migrate plan does exist for the edge computing framework, cancelling a lower priority subtask of the first plurality of subtasks from a designated edge device of the first cluster of edge devices designated to run the higher priority subtask of the second plurality of subtasks based on the subtask cancel and migrate plan;

migrating the lower priority subtask of the first plurality of subtasks canceled from the designated edge device of the first cluster of edge devices to another edge device that is not included in the first cluster of edge devices for running based on the subtask cancel and migrate plan;

sending the higher priority subtask of the second plurality of subtasks to the designated edge device of the first cluster of edge devices for running; and sending, between proxy components included in each of the first cluster of edge devices, a result of running a subtask on its corresponding edge device to other edge devices included in the first cluster of edge devices based on cluster metadata corresponding to the first cluster of edge devices.

2. The computer-implemented method of claim 1 further comprising:
responsive to determining that the subtask cancel and migrate plan does not exist for the edge computing framework, suspending the lower priority subtask of the first plurality of subtasks on the designated edge device of the first cluster of edge devices designated to run the higher priority subtask of the second plurality of subtasks based on a subtask pending plan for the edge computing framework;
sending the higher priority subtask of the second plurality of subtasks to the designated edge device of the first cluster of edge devices for running; and
invoking the lower priority subtask of the first plurality of subtasks suspended on the designated edge device of the first cluster of edge devices to run when the higher priority subtask of the second plurality of subtasks finishes running on the designated edge device.

3. The computer-implemented method of claim 1 further comprising:
receiving the first task comprised of the first plurality of subtasks to run;
selecting the first cluster of edge devices from a plurality of edge devices included in the edge computing framework to run respective subtasks of the first plurality of subtasks corresponding to the first task based on attributes of each respective subtask; and
sending each respective subtask of the first plurality of subtasks to a corresponding edge device in the first cluster of edge devices for running.

4. The computer-implemented method of claim 1 further comprising:
sending a status of the first task to a designated coordinator proxy of the first cluster of edge devices, wherein the designated coordinator proxy controls network traffic between edge devices in the first cluster of edge devices.

5. The computer-implemented method of claim 4 further comprising:
synchronizing the status of the first task with a task result receiver of an edge agent using the designated coordinator proxy of the first cluster of edge devices, wherein the edge agent is in communication with a cloud computing environment.

6. The computer-implemented method of claim 1 further comprising:
receiving the second task comprised of the second plurality of subtasks to run while the first task is running on the first cluster of edge devices; and
selecting a second cluster of edge devices from a plurality of edge devices in the edge computing framework to run respective subtasks of the second plurality of subtasks corresponding to the second task that includes the designated edge device of the first cluster of edge devices to run the higher priority subtask of the second plurality of subtasks based on attributes of the higher priority subtask, wherein the another edge device to run the lower priority subtask of the first plurality of subtasks migrated from the designated edge device of the first cluster of edge devices is also not included in the second cluster of edge devices.

7. A computer system for edge device task management, the computer system comprising:
a bus system;
a set of storage devices connected to the bus system, wherein the set of storage devices stores program instructions; and
a set of processors connected to the bus system, wherein the set of processors executes the program instructions to:
determine whether a subtask cancel and migrate plan exists for an edge computing framework when a request to run a higher priority subtask of a second plurality of subtasks corresponding to a second task is received while a first task comprised of a first plurality of subtasks is running on a first cluster of edge devices in the edge computing framework;
cancel a lower priority subtask of the first plurality of subtasks from a designated edge device of the first cluster of edge devices designated to run the higher priority subtask of the second plurality of subtasks based on the subtask cancel and migrate plan in response to determining that the subtask cancel and migrate plan does exist for the edge computing framework;
migrate the lower priority subtask of the first plurality of subtasks canceled from the designated edge device of the first cluster of edge devices to another edge device that is not included the first cluster of edge devices for running based on the subtask cancel and migrate plan;
send the higher priority subtask of the second plurality of subtasks to the designated edge device of the first cluster of edge devices for running; and
send, between proxy components included in each of the first cluster of edge devices, a result of running a subtask on its corresponding edge device to other edge devices included in the first cluster of edge devices based on cluster metadata corresponding to the first cluster of edge devices.

8. The computer system of claim 7, wherein the set of processors further executes the program instructions to:
suspend the lower priority subtask of the first plurality of subtasks on the designated edge device of the first cluster of edge devices designated to run the higher priority subtask of the second plurality of subtasks based on a subtask pending plan for the edge computing framework in response to determining that the subtask cancel and migrate plan does not exist for the edge computing framework;
send the higher priority subtask of the second plurality of subtasks to the designated edge device of the first cluster of edge devices for running; and
invoke the lower priority subtask of the first plurality of subtasks suspended on the designated edge device of the first cluster of edge devices to run when the higher priority subtask of the second plurality of subtasks finishes running on the designated edge device.

9. The computer system of claim 7, wherein the set of processors further executes the program instructions to:
receive the first task comprised of the first plurality of subtasks to run;
select the first cluster of edge devices from a plurality of edge devices included in the edge computing framework to run respective subtasks of the first plurality of subtasks corresponding to the first task based on attributes of each respective subtask; and
send each respective subtask of the first plurality of subtasks to a corresponding edge device in the first cluster of edge devices for running.

10. The computer system of claim 7, wherein the set of processors further executes the program instructions to:

send a status of the first task to a designated coordinator proxy of the first cluster of edge devices, wherein the designated coordinator proxy controls network traffic between edge devices in the first cluster of edge devices.

11. The computer system of claim 10, wherein the set of processors further executes the program instructions to:
synchronize the status of the first task with a task result receiver of an edge agent using the designated coordinator proxy of the first cluster of edge devices, wherein the edge agent is in communication with a cloud computing environment.

12. A computer program product for edge device task management, the computer program product comprising a computer readable storage medium having program instructions embodied therewith, the program instructions executable by a computer system to cause the computer system to perform a method of:
determining whether a subtask cancel and migrate plan exists for an edge computing framework when a request to run a higher priority subtask of a second plurality of subtasks corresponding to a second task is received while a first task comprised of a first plurality of subtasks is running on a first cluster of edge devices in the edge computing framework; responsive to determining that the subtask cancel and migrate plan does exist for the edge computing framework,
cancelling a lower priority subtask of the first plurality of subtasks from a designated edge device of the first cluster of edge devices designated to run the higher priority subtask of the second plurality of subtasks based on the subtask cancel and migrate plan; migrating the lower priority subtask of the first plurality of subtasks canceled from the designated edge device of the first cluster of edge devices to another edge device that is not included the first cluster of edge devices for running based on the subtask cancel and migrate plan;
sending the higher priority subtask of the second plurality of subtasks to the designated edge device of the first cluster of edge devices for running; and
sending, between proxy components included in each of the first cluster of edge devices, a result of running a subtask on its corresponding edge device to other edge devices included in the first cluster of edge devices based on cluster metadata corresponding to the first cluster of edge devices.

13. The computer program product of claim 12 further comprising:
responsive to determining that the subtask cancel and migrate plan does not exist for the edge computing framework, suspending the lower priority subtask of the first plurality of subtasks on the designated edge device of the first cluster of edge devices designated to run the higher priority subtask of the second plurality of subtasks based on a subtask pending plan for the edge computing framework;
sending the higher priority subtask of the second plurality of subtasks to the designated edge device of the first cluster of edge devices for running; and
invoking the lower priority subtask of the first plurality of subtasks suspended on the designated edge device of the first cluster of edge devices to run when the higher priority subtask of the second plurality of subtasks finishes running on the designated edge device.

14. The computer program product of claim 12 further comprising:
receiving the first task comprised of the first plurality of subtasks to run;
selecting the first cluster of edge devices from a plurality of edge devices included in the edge computing framework to run respective subtasks of the first plurality of subtasks corresponding to the first task based on attributes of each respective subtask; and
sending each respective subtask of the first plurality of subtasks to a corresponding edge device in the first cluster of edge devices for running.

15. The computer program product of claim 12 further comprising:
sending a status of the first task to a designated coordinator proxy of the first cluster of edge devices, wherein the designated coordinator proxy controls network traffic between edge devices in the first cluster of edge devices.

16. The computer program product of claim 15 further comprising:
synchronizing the status of the first task with a task result receiver of an edge agent using the designated coordinator proxy of the first cluster of edge devices, wherein the edge agent is in communication with a cloud computing environment.

17. The computer program product of claim 12 further comprising:
receiving the second task comprised of the second plurality of subtasks to run while the first task is running on the first cluster of edge devices; and
selecting a second cluster of edge devices from a plurality of edge devices in the edge computing framework to run respective subtasks of the second plurality of subtasks corresponding to the second task that includes the designated edge device of the first cluster of edge devices to run the higher priority subtask of the second plurality of subtasks based on attributes of the higher priority subtask, wherein the another edge device to run the lower priority subtask of the first plurality of subtasks migrated from the designated edge device of the first cluster of edge devices is also not included in the second cluster of edge devices.

* * * * *